W. A. SIMOND.

ROTARY PUMP.

APPLICATION FILED APR. 6, 1916.

Reissued Aug. 8, 1916. 14,180.

Inventor:

Walter Aiken Simond,

By Dodge and Sons,

Attorneys

THE NORRIS PETERS CO., PHOTO-LITHO. WASHINGTON, D. C.

UNITED STATES PATENT OFFICE.

WALTER AIKEN SIMOND, OF FRANKLIN, NEW HAMPSHIRE, ASSIGNOR, BY DIRECT AND MESNE ASSIGNMENTS, TO THE GYRO PUMP COMPANY, OF FRANKLIN, NEW HAMPSHIRE, A CORPORATION OF NEW HAMPSHIRE.

ROTARY PUMP.

14,180. Specification of Reissued Letters Patent. Reissued Aug. 8, 1916.

Original No. 1,062,803, dated May 27, 1913, Serial No. 690,295. Application for reissue filed April 6, 1916. Serial No. 89,506.

*To all whom it may concern:*

Be it known that I, WALTER AIKEN SIMOND, a citizen of the United States, and a resident of Franklin, in the county of Merrimack and State of New Hampshire, have invented a new and Improved Rotary Pump, of which the following is a full, clear, and exact description.

This invention has reference to rotary or centrifugal pumps for water or other fluids, and such as are adapted for use on shafts which are vertical or inclined to any extent.

The invention consists of the peculiar features of construction hereinafter fully described and claimed, and illustrated in the accompanying drawings, in which:—

Figure 1:
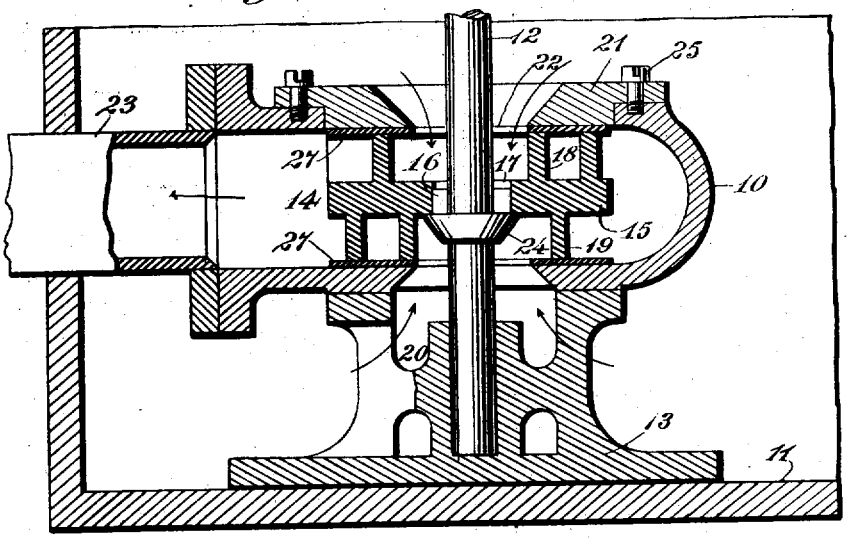
Figure 2:
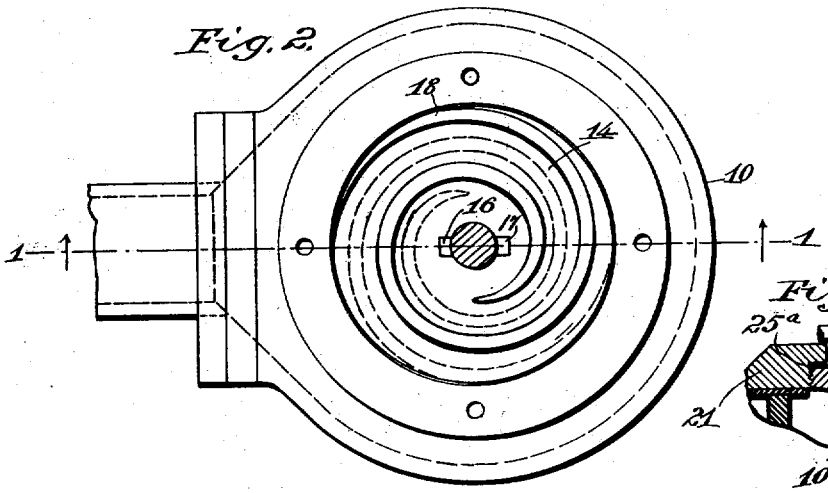
Figure 3:
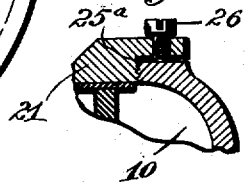

Figure 1 is a vertical section substantially on the line 1—1 of Fig. 2; Fig. 2 is a plan view with the upper face plate removed; and Fig. 3 is a detail of an alternative means for connecting the face plate or cover to the main body of the casing.

The pump herein set forth comprises a casing 10 adapted to be introduced into or to be located in any place from which water or other fluid is to be pumped, as for instance a well, hold of a vessel or the like, indicated conventionally at 11.

At 12 is indicated a driving shaft, shown as being arranged vertically and stepped into a base 13. While said shaft is described as being vertical, it will be understood that it may be arranged in any other position and the other portions of this description will be read and interpreted accordingly.

The principal movable part of this pump consists of a rotor 14 comprising a simple disk 15 adapted to be driven at high speed by the shaft 12, but with which it has preferably loose longitudinal connection. Such connection is herein indicated as being made by the key 16 extending from the shaft into a keyway 17 in the disk. The rotor disk has rigidly connected or formed integrally therewith a pair of equal oppositely arranged volutes or spirals 18 and 19, said spirals being on opposite sides of the disk and so arranged that one of them is 180 degrees in advance of the other and in consequence every similar point is diametrically opposite, whereby the device is better balanced with respect to rotation, and the efficiency of the pump materially increased. In fact, I have found, by extended experiments, that the shaft 12 is practically relieved from all side, as well as end thrust, even when operated at high speed.

The casing 10 is provided on one side with an opening 20 through which water may be admitted adjacent the spiral 19, and the other side of the casing is provided with a removable cover 21 having an opening 22 adjacent the spiral 18. These openings may permit fluid of the same kind to be admitted into the casing, or by suitable arrangement of pipes, fluids of different species may be introduced into the pump from opposite sides to be therein mixed and delivered from the casing through the outlet 23.

The shaft 12 is provided with a collar 24 which supports the rotor under certain conditions, but the form and arrangement of the casing and rotor are such that when driven at the ordinary high speed, the rotor will be self-centering or will be floated in the casing independently of said collar. The cover 21 may be secured to the casing either by a set of screw bolts 25 as indicated in Fig. 1, or by means of screw threads $25^a$ as shown in Fig. 3, and subsequently locked in place by one or more set screws 26. When this pump is used for conveying sandy or gritty fluids, I may provide one or more wear plates 27 within the casing and carried preferably by the spirals 18 and 19.

I desire not to be limited to the exact features of construction herein illustrated; for instance, the spirals may have more or less convolutions, depending upon the work to be performed. If the load is heavy, as for instance during a high lift, the number may be materially increased, whereas if the lift is low, the spirals may have a lesser number of turns. Again, it is to be noted that the outer end of each spiral is so formed as to be approximately concentric with the shaft, whereby the resistance to high rotation is decreased, although I prefer to form the channel of the spiral of approximately uniform cross section.

Having thus described my invention, what I claim as new and desire to secure by Letters Patent is:—

1. In a centrifugal pump, a rotor consisting of a simple disk having on each side thereof a single spiral channel, the channel on one side of the disk being approximately 180° in advance of the channel on the other side, and the said channels being non-alined throughout their length, a shaft on which the disk is mounted and by which it is adapted to be rotated, and a casing inclosing the said disk and provided with a bearing in which the shaft is rotatable, and having opposite central openings for the admission of fluid, and a peripheral opening for the discharge of fluid.

2. In a centrifugal pump; a casing having a peripheral discharge opening and at least one centrally disposed admission opening for the fluid to be pumped; a rotor mounted in said casing and having on each side thereof a single spiral channel, the channel on one side of the disk being approximately 180° in advance of the channel on the other side, and the said channels being non-alined throughout their length; and a shaft on which the rotor is mounted and by which it is to be rotated.

3. In a centrifugal pump, a rotor consisting of a disk-like member having on each side thereof a single spiral channel, the channel on one side of said member being approximately 180° in advance of the channel on the other side, and the said channels being non-alined throughout their length; a shaft on which the disk is mounted and by which it is adapted to be rotated; and a casing inclosing the said disk-like member and provided with a bearing for said shaft, said casing likewise having a peripheral opening for the discharge of fluid and means for admitting fluid centrally thereto.

In testimony whereof I have signed my name to this specification.

WALTER AIKEN SIMOND.

Copies of this patent may be obtained for five cents each, by addressing the "Commissioner of Patents, Washington, D. C."